United States Patent [19]

Kügler

[11] Patent Number: 5,201,608
[45] Date of Patent: Apr. 13, 1993

[54] PROCESS FOR SEALING SOIL FORMATIONS, ESPECIALLY WASTE DUMPS

[76] Inventor: Jost-Ulrich Kügler, Im Teelbruch 61, 4300 Essen 18, Fed. Rep. of Germany

[21] Appl. No.: 610,700

[22] Filed: Nov. 8, 1990

Related U.S. Application Data

[63] Continuation-in-part of Ser. No. 347,780, Jun. 12, 1989, abandoned.

[30] Foreign Application Priority Data

Aug. 21, 1987 [DE] Fed. Rep. of Germany ....... 3727978
Aug. 25, 1987 [DE] Fed. Rep. of Germany ....... 3727819

[51] Int. Cl.$^5$ ........................... C02F 11/14; B09B 1/00
[52] U.S. Cl. ................... 405/129; 405/128; 405/263; 106/706; 106/900; 210/151
[58] Field of Search ............... 405/128, 129, 263, 264; 210/751; 106/600, 679, 706, 707, 714, 790, 796, 900

[56] References Cited

U.S. PATENT DOCUMENTS

| | | | |
|---|---|---|---|
| 4,015,997 | 4/1977 | Selmeczi et al. | 106/117 X |
| 4,028,130 | 6/1977 | Webster et al. | 106/120 |
| 4,043,830 | 8/1977 | Suzuki | 405/263 X |
| 4,328,037 | 5/1982 | Demirel et al. | 106/DIG. 1 X |
| 4,436,556 | 3/1984 | Kadelka | 405/266 X |
| 4,472,198 | 9/1984 | Nowicki et al. | 106/706 |
| 4,539,121 | 9/1985 | Kapland | 210/751 |
| 4,552,666 | 11/1985 | Muller | 210/751 X |
| 4,615,809 | 10/1988 | King | 106/DIG. 1 X |
| 4,762,623 | 8/1988 | Kapland | 210/751 |

FOREIGN PATENT DOCUMENTS

125680 11/1984 European Pat. Off. .
144873 12/1978 Japan ........................... 106/900

*Primary Examiner*—Dennis L. Taylor
*Assistant Examiner*—John Ricci
*Attorney, Agent, or Firm*—Arnold, White & Durkee

[57] ABSTRACT

A process for sealing soil formations, especially for sealing the base of a waste dump or encapsulating waste dumps or old sources of pollution. By this process, sewage sludge or river mud is mixed with water absorbent aggregate that is approximately 30–70 wt %, based on sludge or mud dry weight, forming a compressible non-hardening mixture. The resultant mixture is then applied to the soil formation and compressed mechanically, forming a non-hardening seal.

27 Claims, No Drawings

PROCESS FOR SEALING SOIL FORMATIONS, ESPECIALLY WASTE DUMPS

CROSS-REFERENCE TO RELATED APPLICATIONS

This application is a continuation in part of co-pending application Ser. No. 347,780, filed Jun. 12, 1989, now abandoned.

BACKGROUND OF THE INVENTION

This invention relates in general to a process for sealing soil formations. More particularly, this invention relates to a novel process for sealing soil formations, especially for sealing the base of a dump or for encapsulating old pollution sources or dumps, using sludge, such as sewage sludge or river mud.

There have recently been substantial problems in disposing of wet sludge. For example, large quantities of wet sludge are obtained each year in removing mud from seaports. Such mud is often contaminated with heavy metals. Before disposing of this sludge, it is common to partially dry the sludge, optionally after adding flocculants, by means of traveling screen presses, thereby forming a soft plastic material with water content between 55-80%, based on the dry solids.

This waste material must usually be stored in sealed dump areas, depending on the pollution content of the sludge. Such sludge is primarily classified in waste dump class II, and in some cases in waste dump class III. Such waste dumps must be provided with a special seal to protect the soil and ground water. To achieve the required waste dump properties, the natural soil formation of the planned dump site must be sealed by means of a special process. But, the coefficients of permeability to be achieved by such sealing measures have become increasingly stricter. Consequently, the disposal of sludge in sealed waste dumps is expensive, particularly as a result of the following two factors: (1) a soft sludge mass cannot be dumped without additives, because the sludge lacks stability and load bearing capacity; and (2) large quantities of sludge require a larger and more expensive dump area, using up area that could be used for other materials. This latter factor is of special interest because new dumping areas will be available only to a limited extent in the future.

Thus, while sewage sludge is a waste product that is available almost everywhere and is also inexpensive, disposal by incineration or dumping in sealed waste dumps is expensive. As a consequence, there is a need for different types of disposal of sludge.

In the past, one use developed for sewage sludge obtained from waste water treatment facilities has been for sealing subsurface soil layers. European Patent B 125,680 describes such a process whereby the sewage sludge is used to seal subsurface soil layer of sand or gravel and sand against water. In this process, the sludge was rendered in a pasty or kneadable form by removing water, and mixed with the soil layer in a weight ratio of about 10-30%, based on the dry weight of the soil layer. The mixture is then mechanically compressed. A special use of this process is for sealing sand or gravel layers allowing soil above the sealing soil layer to be cultivated and watered, thus making permanent plantings in desert regions economically possible for the first time.

While adequate coefficients of permeability for many purposes can be achieved using the process described in European Patent B 125,680, a stronger sealing effect with a smaller coefficient of permeability is not necessary for the uses it disclosed, such as cultivation. However, the situation is different for waste dumps. There, the coefficient of permeability achieved by sealing methods must be much more stringent. Thus, in the past waste dumps have been sealed with clays, or sometimes plastic sheets. But, much better coefficients of permeability can now be achieved through the present invention, allowing mud or sewage sludge to be used to encapsulate, or seal, such dumps.

The problems enumerated in the foregoing are not intended to be exhaustive, but rather are among the many which tend to impair the effectiveness of previously known processes. Other noteworthy problems may also exist; however, those presented above should be sufficient to demonstrate that processes appearing in the art have not been altogether satisfactory.

Recognizing the need for an improved process, it is therefore a general object of the present invention to provide a novel process for sealing soil formations, especially for sealing the base of waste dumps or encapsulating waste dumps and old pollution sources, by using sewage sludge or river mud, thus minimizing or reducing the problems of the types previously noted.

It is a further object of the present invention to provide a novel process for using sludge or mud as a construction material for sealing the base or encapsulating the surface of existing dumps in collecting basins for contaminated water, instead of simply disposing of the sludge or mud.

It is a further object of the present invention to provide a novel process for sealing soil formations which achieves a much better coefficient of permeability than processes previously noted.

It is a further object of the present invention to provide a novel process for sealing soil formations with a non-hardening seal.

SUMMARY OF THE INVENTION

Briefly stated and in accordance with a presently preferred embodiment of the process according to the invention, the process is for sealing soil formations, especially for sealing the base of dumps or for encapsulating old pollution sources or dumps, with a non-hardening seal and comprises the steps of mixing sludge, such as sewage sludge or river mud, with water absorbent aggregate that is approximately 30-70 wt %, based on the sludge dry weight, forming a non-hardening compressible mixture, and applying the resultant mixture to a soil formation and compressing it mechanically.

DETAILED DESCRIPTION OF AN ILLUSTRATIVE EMBODIMENT

While the aspects of the invention that are regarded novel are described with particularity in the appended claims, the invention itself, together with further advantages and features thereof, may be more readily understood by reference to the following detailed description.

By the process according to this invention, sludge is first mixed with a water absorbent aggregate. This sludge is either sewage sludge or mud. The water content of partially dried sludge from a sewage treatment facility is typically 50-80 wt %, based on the sludge dry solids. Such partially dried sludge can be used directly in the process according to this invention. If the water content is higher, e.g., if the sewage sludge has been exposed to the influence of rainfall without weather protection, a partial prior drying to less than or equal to 80 wt % is advantageous; a water content of 50–60 wt % is preferred, and 50–55 wt %, is more preferred. It is also possible to achieve a partial drying effect by adding powdered clay. A lower water content is less problematical, because water can be added any time when mixing sludge with the aggregate.

Similarly, the water content of partially dried mud obtained in desilting river beds is typically about 50–70 wt %, based on sludge dry solids. This material can be used directly in the process according to this invention. If the water content is higher, e.g., if the mud has been exposed to the influence of rainfall without weather protection, prior partial drying to less than or equal to 70 wt % is advantageous; but, a water content of 50–60 wt % is preferred, and 50–55 wt % is more preferred. It is also possible to achieve partial drying by adding powdered clay. A lower water content is less problematical because water can be added at any time when mixing the mud with the aggregate.

Water absorbent aggregates are mixed with the sludge, in order to absorb water in the sludge. The amount of aggregates to be added is approximately 30–70 wt %, based on the sludge dry weight. The amount of aggregates also depends on the water content of the aggregates themselves. Thus, when using dried aggregates, the amount of dried aggregates is preferably 40–60 wt %, and 45–55 wt % is more preferred, each based on the sludge dry weight of the mixture.

While many types of aggregates may be used in the process, only those aggregates can be used which, when mixed with the sludge or mud, form a non-hardening mixture. Experience has shown that a useful seal cannot be obtained through use of a hardenable, cementitious or non-compressible mixture. Thus, hardenable materials, such as those having cementitious, hydraulic or pozzolanic properties, are inappropriate as aggregate.

Since the water content of the sludge is usually at the upper limit, dried aggregate is preferably used because it has a higher water uptake capacity, thus having a drying effect on the sludge. Aggregates with a stable grain are preferably used here so the grain dimensions are maintained even under the influence of moisture or chemical reactions.

In another preferred embodiment of the process, crushed material with a high shear strength is used as the aggregate. This material greatly increases the stability of the resultant mixture when compared with the use of material with a round grain.

Examples of preferred aggregates, including cost considerations, include recycled sands such as chips and rubbish from construction, brick or concrete, sintered power plant ash, ground blast furnace slag and refuse incineration ash, depending on the contents. In the case of refuse incineration ash in particular, separate individual tests must be performed to determine suitability in each case.

The grain size of the aggregates is preferably 0/6 mm or 0/8 mm (i.e., the grains have a size distribution of 0 to 6 mm, or 0 to 8 mm). Thus, the grain size is relatively coarse, and the size distribution allows for a dense packing of the aggregate. The suitability also depends on the thickness of the individual sealing layers. For a layer thickness of less than 25 cm, the grain size is preferably 0/8 mm; for a layer thickness of greater than 25 cm, larger grains up to a size of 16 mm may also be used.

Additional suitable aggregates include lava sand and limestone sand, as well as filtered dust because of its drying effect. Due to the high quality of the sealing effect, leakage of pollutants is largely ruled out. A dense sludge/filtered dust mixture is also possible for dumping in specialized dumps because of the high pollution burn of the filtered dust. The reduction in the elution factor improves the waste dump class.

But, aggregates that have hardening properties, such as hydraulic, cementitious or pozzolanic properties, are not suitable in the process according to the invention. Thus, aggregates such as lime or fly ash, which have pozzolanic properties, are not useful in producing a suitable seal. Similarly, aggregates such as granulated blast furnace slag, which have hydraulic or cementitious properties (unlike non-granulated ("normal") blast furnace slag), are inappropriate. When such aggregates have been used with sludge, they have typically been used in applications such as landfills or roadbeds where hardening is desired. But, all such aggregates having hardening properties are to be avoided in the present invention, because a hardened mixture would not possess the elasticity that is necessary for maintaining the sealing properties, such as a smaller coefficient of permeability, desirable for soil formations like dumps.

The sludge is preferably mixed with the aggregates in a mixer, such as a forced mixer, in such a way as to form a visually homogeneous mixture. If the requirements regarding the water permeability coefficients of a given waste dump that is to be established are not too high, it is adequate to mix sludge directly on the soil formation using suitable machines. In cases where higher demands are made concerning water permeability, however, this method is no longer sufficient. Instead, it is then necessary to perform the mixing of the sludge with the aggregates in a mixing apparatus, e.g., a forced mixer, so as to yield a visually homogeneous mixture.

It is already known that mud can be dried by adding lime in such a way that it can be processed like a wet loam although it is compact. However, a useful seal cannot be achieved with lime, as shown by our own laboratory experiments.

After mixing the sludge and aggregates, the resultant mixture is applied to the soil formation. The resultant mixture is then mechanically compressed. The mechanical compression is preferably accomplished by static rolling of layers of the mixture, applied layer by layer, with an individual layer thickness of 20–25 cm. The layers are preferably compressed sufficient to achieve a proctor density of at least 90%, and more preferably 94%. Thus, permeability coefficients of $K = 4 \times 10^{-9}$ to $5 \times 10^{-10}$ m/sec are achieved according to this invention.

In a preferred embodiment, an additional sealing effect is achieved by adding powdered clay or powdered water glass to the mixture of sludge and aggregates. The powdered clay is added in an amount of up to 10 wt %, based on the dry weight of the mixture. The powdered water glass is added in an amount of up to 2 wt %, preferably 1–2 wt %, based on the dry weight of the mixture. A commercial powdered water glass is available under the brand name Deposil N.

In another preferred embodiment, agents that form a soft gel are added in addition to water glass. These agents preferably include those based on sodium aluminate ($NaAlO_2$ or ($Na_2Al_2O_4$, $n \times NaOH$)$\cdot 0.5\ H_2O$), or optionally aluminum oxide. The soft gel forming substances are preferably used in amounts of 0.5 to 1 wt %, based on the dry weight of the mixture.

Experiments have shown that liquid gelatinizing agents should be added to water glass, preferably in a ratio of 1:3 to 1:5. A soft plastic mass that cannot be compressed further is formed when water glass is added to the sludge in the form of a liquid. Therefore, the water glass is first added in dry form. After about 24 hours, the water glass dissolves in the aqueous phase available from the sludge. Only then can the soft gelatinous substances be added in a subsequent operation.

It is also possible to use the sludge with the conventional single-phase and two-phase sealing wall compounds such as those used to produce vertical retention walls for the desired sealing effect. Examples of commercial single-phase sealing water compounds include DYNAGROUT DWR-C or those available from Dynamit Nobel (silanes). Examples of commercial two-phase retention wall compounds include DYNAGROUT DWR-A and DWR-B.

The stabilization measures described above are essential for achieving the desired sealing effect. Using this process, coefficients of permeability values of $5 \times 10^{-10}$ to $3 \times 10^{-11}$ m/sec have likewise been measured. Such layers retain their soft plastic form and are more difficult to process.

Coefficients of permeability of 1 to $5 \times 10^{-10}$ m/sec have been obtained by mixing water glass with soft gelatinous substances and mixing thoroughly, and then compressing and leaving the mixture to stand for five days. If the standing time is longer, the initial K values are improved to $K = \leq 10^{-10}$ m/sec.

Another advantage of using water glass is that the heavy metal ions which are often present in sludge are bound by the silicic acid thus formed. But, the bonding effect depends on the quantity added. Therefore, the process has also been carried out with larger quantities of water glass than needed for the sealing effect, without thereby losing the compressibility and sealing effect of the finished layer.

In addition, by adding substances that bind the heavy metals by way of surface chemical reactions, the desired immobilization is achieved without having a negative influence on the sealing effect.

Examples of surface chemical reactions include electrostatic interactions, such as Si-O$^-$ M$^+$ (M=heavy metal ion), or electrostatic interactions with a high Si-S$^-$ M$^+$ chemical bond content. Immobilization has also been achieved by insertion of zeolitic compounds.

The process according to this invention makes it possible to produce mineral sealing compounds which conform to the demands of authorities when used in a precise dosage, depending on the composition of the sludge. In addition, this process is also especially suitable for providing existing waste dump beds with a surface sealing, encapsulating the dump in order to prevent rainfall from entering the dump. Old pollution burdens are often merely provided with a mineral seal to prevent further leaching of pollutants, in order to clean up the surface if the pollution content allows such a measure. In all such cases, the present process can be used, at the same time disposing of the unwanted waste products of sewage sludge and river mud.

Another advantage of the process according to this invention is that the sand and fine gravel present in the sludge need not be removed, as is the case in traditional sludge disposal.

In addition, the process according to this invention has another important advantage in the preferred version using water glass. Organic substances present in the sludge are enclosed so well that they no longer rot. Thus, there is no need to fear a negative effect on the sealing action due to the rotting of organic substances. Therefore, it is also possible to use this sealing process for collecting basins with a permanent water level.

While the invention has been shown in connection with certain presently preferred embodiments thereof, those skilled in the art will recognize that many modifications may be made therein without departing from the true spirit and scope of the invention. Accordingly, it is intended that the following claims cover all equivalent modifications and variations as fall within the spirit and scope of the invention.

What is claimed is:

1. Process for sealing a soil formation such as an old source of pollution or a waste dump, which process comprises:
   mixing sewage sludge or river mud with approximately 30 to 70 wt %, based on the sludge or mud dry weight, a water absorbent, grain stable aggregate;
   forming a non-hardening compressible mixture of the aggregate and the sludge or mud;
   applying the resultant mixture to the soil formation; and compressing the resultant, applied mixture mechanically.

2. Process according to claim 1, wherein the mixing step comprises mixing a dried aggregate with the sewage sludge or river mud.

3. Process according to claim 1, wherein the mixing step comprises mixing a crushed aggregate having a high shear strength with the sewage sludge or river mud.

4. Process according to claim 1, further comprising selecting the aggregate from the group consisting of recycled sand, power plant ash, refuse incineration ash or ground blast furnace slag.

5. Process according to claim 1, wherein the mixing step comprises mixing the sewage sludge or river mud and aggregate until the resultant mixture is homogeneous.

6. Process according to claim 1, further comprising applying the resultant mixture layer by layer in a thickness of 20 to 25 cm for each layer, and mechanically compressing the layers of resultant applied mixture by static rolling.

7. Process according to claim 6, further comprising compressing the layers to a proctor density of at least 90%.

8. Process according to claim 6, further comprising compressing the layers to a proctor density of at least 94%.

9. Process according to claim 1, further comprising mixing powdered water glass in the amount of 1 to 2 wt %, based on the dry weight of the mixture with the aggregate and sewage sludge or river mud.

10. Process according to claim 9, further comprising mixing a soft gel forming substance in the amount of 0.5 to 1 wt %, based on the dry weight of the mixture, with the aggregate, powdered water glass, and sewage sludge or river mud.

11. The process according to claim 10, wherein the soft gel-forming substance comprises sodium aluminate.

12. The process according to claim 10, wherein the powdered water glass is mixed with the aggregate and the sewage sludge or river mud until dissolved, and the soft gel-forming substance is mixed with the aggregate, water glass and sewage sludge following such solution.

13. The process of claim 1 or 2, wherein the step of mixing uses aggregate having a grain size distribution of 0 to 6 mm.

14. The process of claim 1 or 2, wherein the step of mixing uses aggregate having a grain size distribution of 0-8 mm.

15. A process for forming a non-hardening seal upon a soil formation such as a waste dump, comprising the steps of:
mixing sewage sludge or river mud with water absorbent aggregate which aggregate comprises approximately 30 to 70 wt % of a resultant mixture based on the sludge or mud dry weight;
forming a compressible non-pozzolanic mixture upon such mixing;
applying the mixture upon a soil formation; and,
compressing the mixture to form a non-hardening seal.

16. The process according to claim 15, wherein the step of mixing uses aggregate selected from the group of recycled sand, power plant ash, refuse incineration ash, ground blast furnace slag, lava sand and or limestone sand.

17. The process according to claim 16, comprising the step of additionally mixing powdered water glass with the mixture, wherein the powdered water glass comprises 1 to 2 wt % of the mixture based on the dry weight of the mixture.

18. The process according to claim 17, comprising the step of additionally mixing sodium aluminate with the mixture, wherein the sodium aluminate comprises 0.5 to 1 wt % of the mixture based on the dry weight of the mixture.

19. The process according to claim 15, wherein the step of applying the mixture upon the soil formation is in a plurality of layers, each layer having a thickness of 20 to 25 cm, and each layer is compressed before the next layer is applied.

20. The process according to claim 19, wherein the layers are compressed to a proctor density of at least 90%.

21. The process according to claim 19, wherein the layers are compressed to a proctor density of at least 94%.

22. The process according to claim 19, wherein the step of mixing uses aggregate having a grain size distribution of 0 to 8 mm.

23. The process according to claim 15, wherein the step of mixing uses aggregate having a grain size distribution of 0 to 8 mm.

24. The process according to claim 15, wherein the step of mixing uses sewage sludge having a water content of 50 to 80 wt %, based on the sludge dry weight.

25. The process according to claim 15, wherein the step of mixing uses mud having a water content of 50 to 70 wt %, based on the mud dry weight.

26. The process according to claim 15, wherein the mixture is applied and compressed to form a seal having a permeability coefficient k less than $4 \times 10^{-9}$ m/sec.

27. The process according to claim 15, wherein the mixture is applied and compressed to form a seal having a permeability coefficient k less than $5 \times 10^{-10}$ m/sec.

* * * * *

UNITED STATES PATENT AND TRADEMARK OFFICE
CERTIFICATE OF CORRECTION

PATENT NO. : 5,201,608
DATED : April 13, 1993
INVENTOR(S) : Jost- Ulrich Kügler

It is certified that error appears in the above-indentified patent and that said Letters Patent is hereby corrected as shown below:

Column 4, line 67, delete ").0.5" and insert -- )*0.5 --.

Column 5, line 33, delete "$\leq$", and insert -- $\leq$ --.

Column 6, line 58, delete "mixture with", and insert -- mixture, with --.

Signed and Sealed this

Twenty-eighth Day of December, 1993

Attest:

BRUCE LEHMAN

*Attesting Officer*     Commissioner of Patents and Trademarks